United States Patent [19]

Gray

[11] 3,728,524

[45] Apr. 17, 1973

[54] COUNTER ANTI-JITTER CIRCUIT

[75] Inventor: Norman E. Gray, La Habra, Calif.

[73] Assignee: Newport Laboratories, Santa Ana, Calif.

[22] Filed: Nov. 18, 1971

[21] Appl. No.: 199,976

[52] U.S. Cl. .....235/92 PL, 235/92 EA, 235/92 DM, 235/92 R, 324/99 D, 340/324 R

[51] Int. Cl. ........................H03k 21/34, H03k 21/02

[58] Field of Search......................235/92 EA, 92 PL, 235/92 PB, 92 BD, 92 FQ, 92 DM, 92 LG; 340/324 R, 347 CC; 324/99 D

[56] References Cited

UNITED STATES PATENTS

| | | | |
|---|---|---|---|
| 3,209,130 | 9/1965 | Schmidt | 235/92 PL |
| 3,062,443 | 11/1962 | Palmer | 235/92 EA |
| 2,521,788 | 9/1950 | Grosdoff | 235/92 BD |
| 3,551,809 | 12/1970 | Dufour | 324/99 D |
| 3,621,391 | 11/1971 | Miller | 324/99 D |

*Primary Examiner*—Thomas A. Robinson
*Assistant Examiner*—Joseph M. Thesz, Jr.
*Attorney*—Charles G. Lyon et al.

[57] ABSTRACT

A digital counter which incorporates a circuit to reduce or prevent jitter in output readings. During a time base signal, a fraction count circuit determines the fractional count of input signals. This fractional count information is combined with input signals prior to the time base signal by using a fractional count modifier circuit. The fractional count modifier circuit modifies the phase of the input signals prior to the start of the time base.

16 Claims, 10 Drawing Figures

COUNTER ANTI-JITTER CIRCUIT

BACKGROUND OF THE INVENTION

The present invention relates to digital counters and the like, and more particularly to an improved counter incorporating means for reducing or eliminating jitter in the readout thereof.

Conventional digital counters include an input shaping circuit, signal gate, time base, counting means and a control circuit as illustrated in FIG. 1 which will be described subsequently. Unless the length of the time base is an exact multiple of the period of the input frequency, it is possible for the counter to read either of two consecutive numbers on its visual readout representing the input frequency. The phase between the input frequency and the time base determines which of the two numbers will be contained in the counter at the conclusion of the time base. As a result of this operation, the numbers presented by the visual readout of the counter will vary between the two numbers giving the effect of jitter in the readout.

SUMMARY OF THE INVENTION

Accordingly, it is a principal object of the present invention to provide an improved digital counter.

A further object of the invention is to provide a digital counter which has reduced jitter in the readout thereof.

An additional object of this invention is to provide in a digital counter a hysteresis characteristic which substantially reduces or eliminates jitter in the readout of the counter when counting input signals wherein a small amount of frequency modulation of the input signals may exist as a result of drift or noise.

A further object of this invention is to introduce a hysteresis characteristic into a digital counter for preventing jitter in the output readings thereof even though a small amount of frequency variation exists in the input signal.

BRIEF DESCRIPTION OF THE DRAWINGS

These and other objects and features of the present invention will become better understood through a consideration of the following description taken in conjunction with the drawings, in which.

DESCRIPTION OF THE PREFERRED EMBODIMENTS

Figure 1:
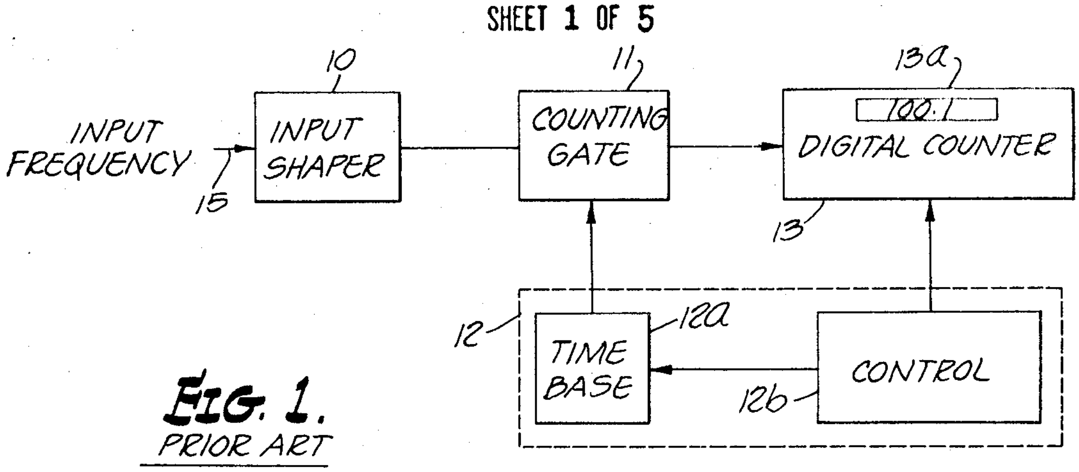
FIG. 1. PRIOR ART
FIG. 1 is a block diagram of the typical prior art digital counter.

Turning first to FIG. 1, the same illustrates a typical prior art digital counter including an input shaper 10, counting gate 11, time base and control circuit 12 further including a time base circuit **12*a* and a control circuit 12*b*, and a digital counter 13 with a visual digital readout 13*a*. As is known to those skilled in the art, a counter of the nature shown in FIG. 1 functions to count input signals applied at an input 15 during the time base generated by the time base circuit 12*a*, an exemplary time base signal being shown at 18 in FIG. 2. In a typical counter, counting of the input signals at input 15 commences, for example when the time base goes positive at 18*a*, and counting terminates when the time base signal goes negative at 18*b***.

Figure 2:
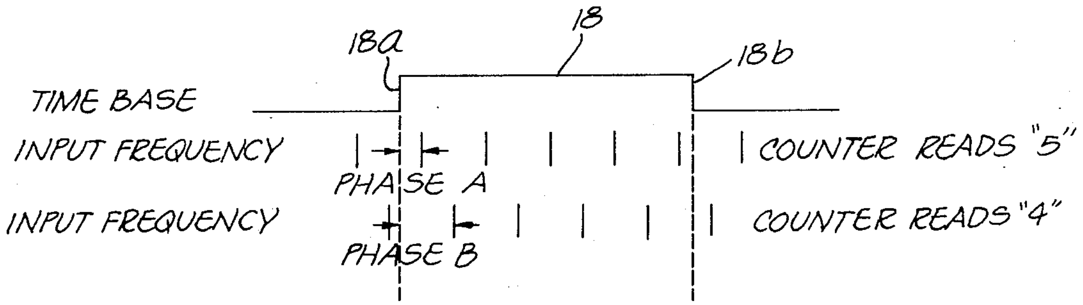
FIG. 2 is a waveform diagram illustrating different phase relationships of input signals with the time phase of the counter of FIG. 1.

FIG. 2 illustrates the time base and two input signals applied to the input 15 which are of the same frequency but of different phases indicated as phase A and phase B with respect to the time base 18. As noted earlier, unless the length of the time base signal 18 is an exact multiple of the period of the input frequency, it is possible for the counter to read either of two consecutive numbers representing the input frequency. The phase between the input frequency and time base determines which of the two numbers will be contained in the counter at the termination **18*b* of the time base 18. This anomaly is illustrated in FIG. 2 wherein the input frequency having a phase A with respect to the time base 18** causes the counter to provide a readout of the number "5," and wherein an input frequency having a phase B with respect to the time base causes the counter to provide a readout of the number "4."

The amount of observable jitter on the readout **13*a* of the digital counter 13 depends on the relationship between the length of the time base 18** and the period of the input frequency. If the length of the time base is an exact multiple of the input frequency, there is no jitter as will be apparent to those skilled in the art. However, if the length of the time base is a multiple, plus a fraction, of the period of the input frequency, there is some jitter assuming that the input frequency is asynchronous with respect to the time base. If the fraction is one-half there is maximum jitter; that is, both numbers (such as, "5" and "4" in FIG. 2) appear with equal probability. For fractions less than, or more than, one-half, the jitter is less than the maximum, with one number having a higher probability of being read out than the other.

The usual time base circuit includes an oscillator followed by a counter to provide the output time base signal. One means proposed in the past for reducing the jitter is to control the start of the time base 18 so that the leading edge **18*a* is synchronized to some predetermined degree with the input frequency applied at input 15**. This can be accomplished using one or more binary circuits or "binaries" between the oscillator and time base counter. These binaries are driven by the time base oscillator whose frequency has been increased by a factor equal to the division created by the addition of the binaries to the time base circuit, and results in the same frequency being applied from the oscillator to the time base counter. The advantage of using the binaries in this manner is that they may be reset with the first pulse of the input frequency. In this way the time base can be synchronized to the input frequency to within one period of the time base oscillator. The more binaries that are used, the higher the oscillator frequency, the shorter the oscillator period, and the better synchronized is the time base with the input frequency. In fact, the phase, which would have a maximum value of a full input period without the synchronization, would be reduced to a maximum value of $T_{osc}/T_{input}$, where $T_{osc}$ is the period of the time base oscillator and $T_{input}$ is the period of the input frequency. However, even though the ration $T_{osc}/T_{input}$ may be small, there is a finite amount of jitter which increases as the input frequency becomes higher.

The concepts of the present invention enable substantial reduction or complete elimination of jitter in the readings of a digital counter. A further modification involves the addition of a hysteresis characteristic which eliminates jitter in the presence of a small amount of frequency modulation of the input signal which may be caused by drift or noise.

Figure 3:
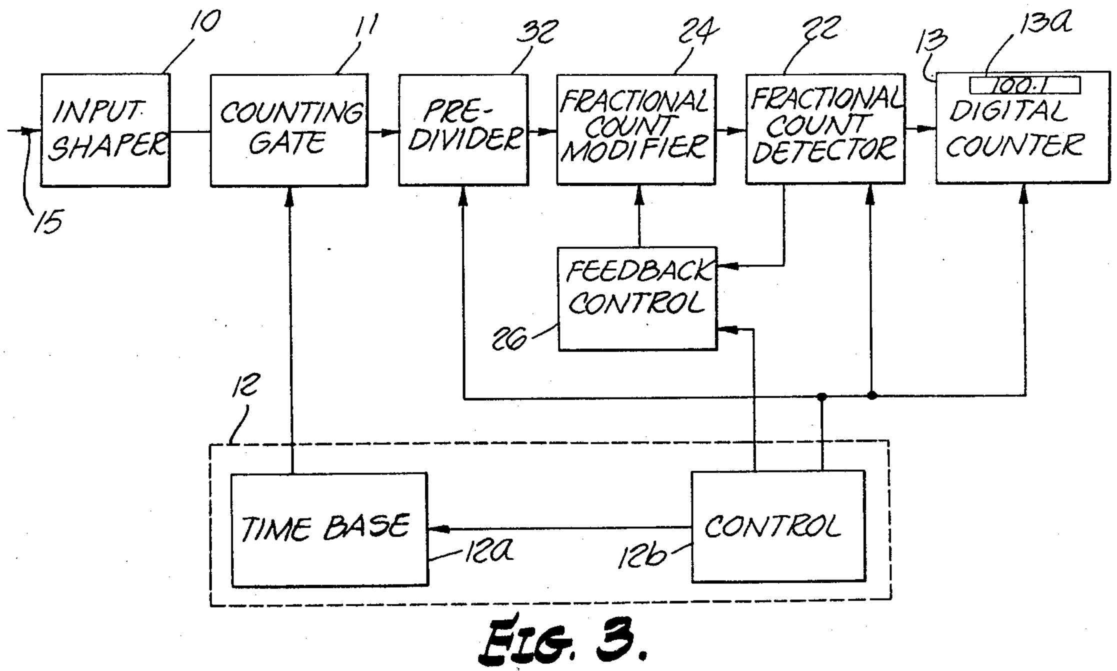
FIG. 3 is a block diagram of a preferred digital counter modified in accordance with the teachings of the present invention.

According to the present concepts, two functionally related circuits, a fractional count modifier 24 and a fractional count detector 22 are added between the counting gate 11 and the digital counter 13 as shown in FIG. 3. Feedback from the second circuit to the first circuit is provided by a feedback control circuit 26. A predivider 32 is an optional circuit that provides hysteresis to the readings when it is included. The fractional count detector 22 contains an ending value during readout of the counter representing a fraction of a count associated with the reading. This value could be contained in one or more binaries or like digital means or in an analog means such as a ramp or other waveform generator with a holding amplifier or the like. The fractional count modifier 24 is capable of adding and/or subtracting a fraction of a count applied to the digital counter either prior to, during, or following the time base period. This may be accomplished with one or more binaries or like digital means or an analog means such as a ramp or other waveform generator with means for adding and/or subtracting energy in the reactive waveform-generating element. The fractional count modifier 24 is controlled by feedback information from the fractional count detector 22 through the feedback control means. Without the optional predivider circuit 32, jitter resulting from differing phase angles between the input signal and the time base is reduced or eliminated. With the optional predivider 32 which contains one or more binary dividers or like digital means or frequency dividing analog means, a hysteresis effect of readings versus direction of frequency change is introduced. This hysteresis effect completely eliminates reading jitter even when the input source contains a small amount of frequency modulation due to noise, drift, or the like.

Figure 4:
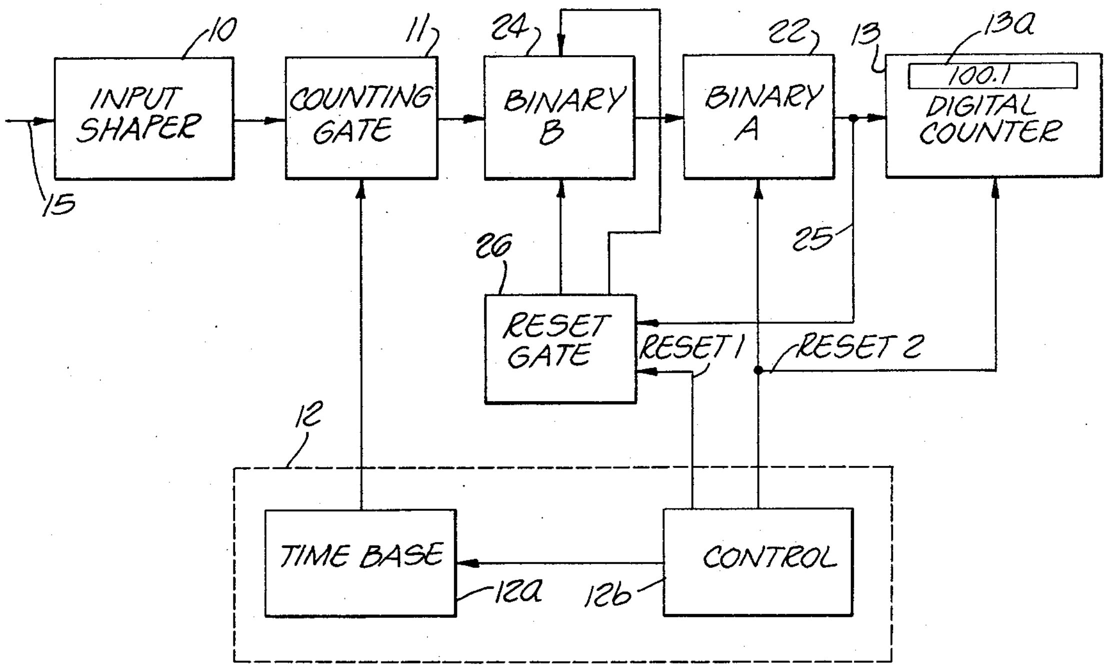
FIG. 4 is a block diagram of an exemplary digital counter modified according to the present invention.

FIG. 4 is an exemplary embodiment of a digital counter incorporating binaries B and A identified by reference numerals 24 and 22 representing the fractional count modifier and fractional count detector respectively. A reset gate 26 represents the feedback control and the optional predivider is not included. These binaries A and B serve the function of prescalers, and the time base provided by the time base circuit **12*a* must be longer (by a factor equal to the prescale ratio) than it would be if these binaries were not present. In the embodiment of FIG. 4, the two binaries A and B divide the input frequency applied to input 15 by four. Since the fractional count detector 22** consists of binary A, the resolution of the detected fractional count is one-half. Since the fractional count modifier consists of binary B only which precedes binary A, the fractional count when added is one-fourth.

Figure 5:
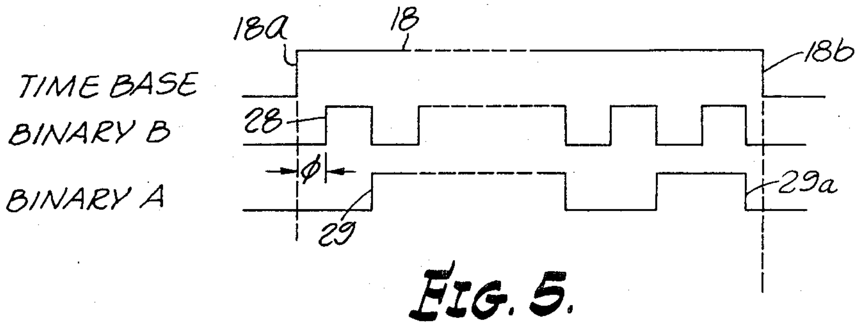
FIGS. 5 and 6 are waveforms illustrating the operational relationships of binary stages of the counter of FIG. 4 with the time base thereof.
Figure 6:
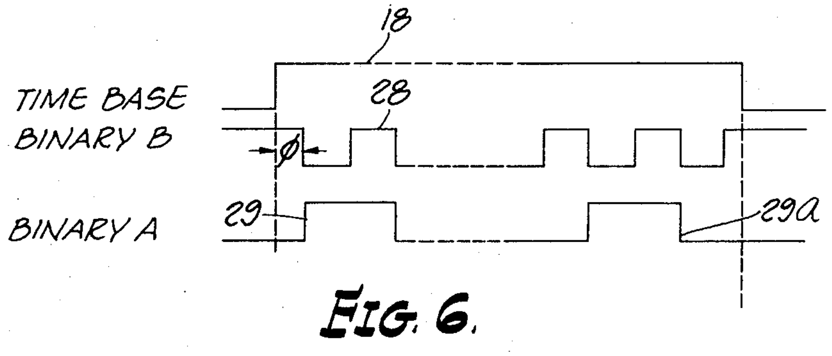

FIGS. 5 and 6 are waveforms which illustrate the operation of the circuit of FIG. 4 incorporating two additional binaries A and B. These figures illustrate a time base waveform 18. The output of binary B is illustrated at 28, and the output of binary A is illustrated at 29 in these figures. Assuming that the digital counter 13 counts a negative transition, as at **29*a*, from the output of binary A, at the end 18*b* of the time base signal 18 in FIG. 4, it will be seen that the binary A has an output that has just gone negative or low. This means that a count was added to the counter 13 just before the end 18*b* of the time base 18 and the fractional count is less than one-half. Assuming for the moment that the binary B and binary A circuits are reset to a low state at the beginning 18a of the time base 18, it will be apparent that if the phase $\phi$ between the time base 18 and binary B increases, the binary B and binary A waveforms move or shift to the right with respect to the time base. Thus, it is possible for the time base to end (at 18*b*) before binary A makes its last negative transition and the fractional count is greater than one-half. This would result in one less count in the counter 13**, and jitter in the readings thereof.

Suppose, however, that binary B is reset to a state that depends upon the final state of binary A. In the example of FIG. 5, since binary A has just made a negative transition **29*a* before the end of the time base 18 it would be desirable to reset binary B to the state that would shift the binary A waveform to the left. This operation would insure, on the next reading, that the last negative transition 29*a* of binary A would occur sooner before the end of the time base 18**.

As shown in FIG. 6, by resetting binary B to the opposite state, the binary A output waveform is shifted by one binary B input pulse to the left. This means that the phase $\phi$ can increase to its limit of one input pulse period without losing the last negative transition **29*a*** of binary A. Conversely, it can be seen that if binary A ends in a high state, the waveform should be shifted to the right to insure no last transition or count even when the phase $\phi$ goes to zero. This can be accomplished by resetting binary B to its initially low state.

Accordingly, the exemplary rule to be used according to the present concepts is to reset binary B to its initially high state if binary A is in its low state at the end of the time base, and to reset binary B to its initially low state if binary A is in its high state at the end of the time base. This feedback control function requires a minimum of two consecutive reset pulses. A first reset pulse resets binary B according to the status of binary A. A second reset pulse resets binary A and the digital counter 13.

Accordingly, the general rule to be used relating to the general concepts of FIG. 3 is to add a fraction of a count to the next reading when the detected fraction of the ending count is less than one-half and to add nothing (or subtract a fraction of a count) when the detected fraction of the ending count is greater than one-half.

Figure 7:
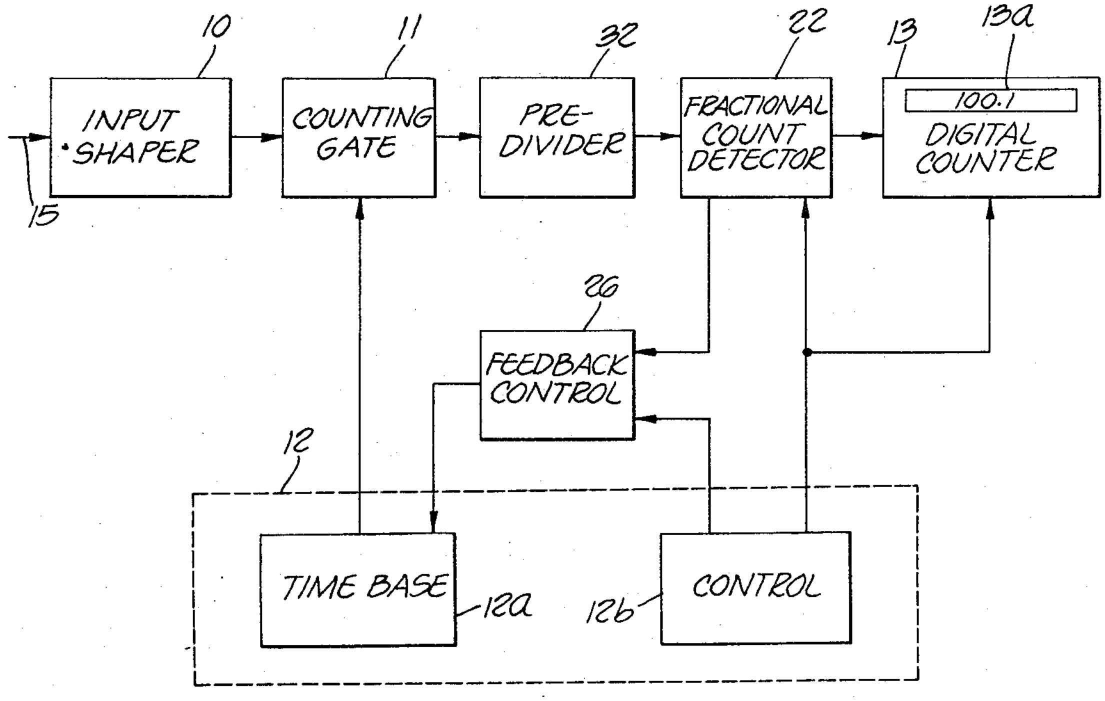
FIG. 7 is a block diagram of an alternative embodiment of a digital counter modified to achieve a reduction or elimination of readout jitter.

FIG. 7 shows that as an alternative, the output lines from the feedback control circuit 26 can, instead of going to the fractional count modifier 24, be applied to the first stage or stages of the time base circuit 12a used in the time base and control circuit 12. The first stage or stages become in essence a fractional count modifier for the time base counter and may use the same or similar circuits. A typical example would be one binary reset to one state or the other depending on the output of fractional count detector 22 as applied through the feedback control 26. The general rule is to lengthen the time base when the detected fraction of the ending count is less than one-half and to shorten the time base when the detected fraction of the ending count is greater than one-half. Modifying the time base results in an amount of shift which is a constant time period rather than a fraction of the input signal period, but nonetheless serves to reduce or eliminate the jitter in the readings.

The improved counter circuit shown in FIG. 4 incorporating the anti-jitter feature results in no jitter provided that the input frequency is constant and without any frequency modulation components. However, if the input frequency (or time base oscillator) jitters slightly in frequency, some jitter in reading may be observed.

The potential for such slight jitter in readings may be explained by considering the input frequency that causes the last negative transition 29*a* of binary A to just miss being counted at the end 18*b* of the time base 18 when the phase $\phi$ is equal to zero. That is, as shown in FIG. 5 with the right end of the binary A waveform 29 to the left the slight amount required to include the last negative transition 29*a* within the time base, binary B will be reset to its high state, and binary A will then be shifted one-half binary B period to the left. The phase $\phi$ may now increase to one-half a binary B period to put the binary A final transition 29*a* at the end of the time base where a small amount of frequency drift of noise could shift this final transition beyond the end of the time base. Binary B would then be reset to its lowest state where it would remain until the phase $\phi$ went to zero and noise caused the cycle to repeat.

The result of this latter type operation is a slight amount of jitter in the readings if the input frequency is on the borderline between two adjacent readings and slightly noisy. This jitter may be eliminated for small amounts of noise if $\phi$ is restricted to less than one-half a binary B period.

Figure 8:
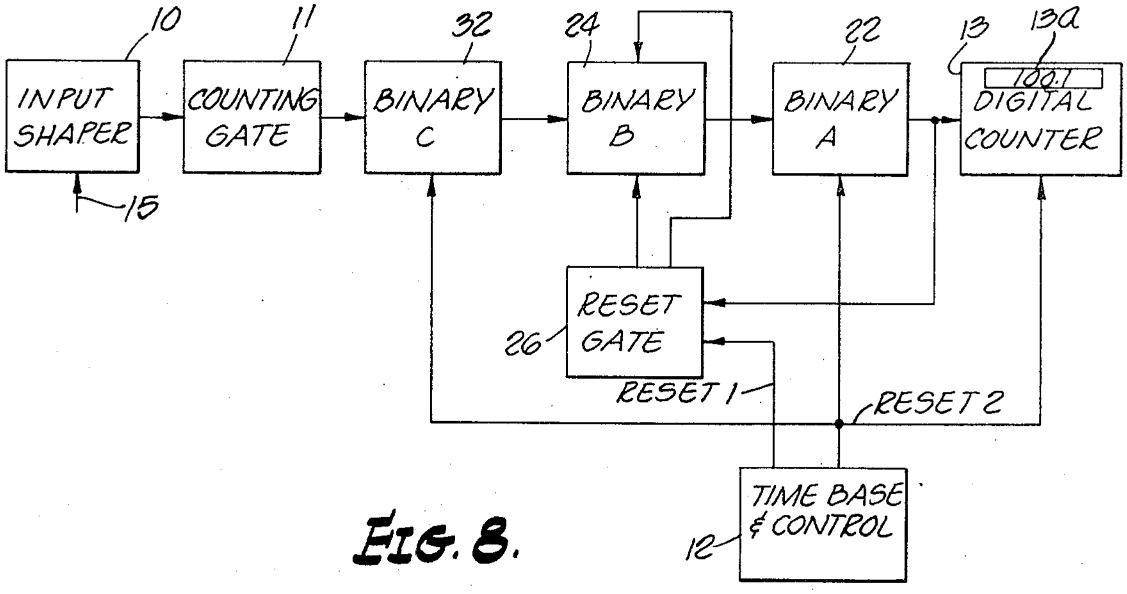
FIG. 8 is a block diagram of an alternative exemplary digital counter modified according to the present invention.

Accordingly, FIG. 8 depicts a further embodiment of the present concepts, which is particularly useful for FM tuner applications wherein a hysteresis characteristic is introduced that prevents jitter in the readings even though small amount of frequency jitter exists on the input signal being counted. This is accomplished by introducing a predivider which might consist of one or more binary circuits preceding binary B, such as binary C identified by reference numeral 32 in FIG. 6. The effect of adding binary C is to restrict the phase $\phi$ to a maximum of one-fourth of a binary B period. The amount of hysteresis effect is equal to one-fourth of a binary B period which equals one-eighth of a binary A period, or one-eighth of a count. This means, in effect, that if the input frequency is gradually increased (as when tuning a tuner) until a new reading just appears on the counter 13, it must then be reduced by a frequency equal to one-eighth count divided by the total period of time base 18 in order to obtain or read the previous reading on the readout 13*a* of the counter 13. Additional binaries also can be added to the predivider, and as further binaries are added the hysteresis approaches a limit of one-fourth count. Different combinations of binaries can be employed as well as different feedback arrangements.

In FIG. 4, two binaries A and B are used with feedback by line 25 from the output of binary A to binary B. With only these two binaries there is no hysteresis effect because the change in counter reading occurs at the same frequency for increasing frequency or decreasing frequency. This results whether the output of binary A is initially reset high or low with a difference of two input cycles involved since it takes two input cycles to change the state of binary A. The arrangement of FIG. 8 is essentially the same as that of FIG. 4 with feedback from the output of binary A to binary B, but with the addition of binary C as a predivider and application of input signals to binary C rather than binary B. This results, as noted above, in a hysteresis effect of one-eighth of a count. On the other hand, if the binary C is used as shown in FIG. 8, but the feedback from the output of binary A is applied to binary C rather than to binary B, no hysteresis effect is realized, since a predivider no longer exists. Binary B becomes functionally an inactive part of the fractional count modifier circuit. Different arrangements of this nature are illustrated in Table I below wherein:

N = number of input cycles into the first binary (i.e., B,C, or D) during the time base period.

R = digital counter reading for any number N of input cycles.

INT means the integral part of the value in parenthesis.

The arrows between A and B or C in the table below are illustrative of the feedback between the binaries noted earlier. Although not necessary, all binaries except A and the one receiving the feedback as indicated by the arrow head are assumed reset to their low state in this illustration.

TABLE I

| | | 1 | 2 | 3 | 4 | 5 |
|---|---|---|---|---|---|---|
| A, reset | Frequency | B A | C B A | C B A | D C B A | D C B A |
| High | Increasing | $R=INT\left(\frac{N+3}{4}\right)$ | $R=INT\left(\frac{N+5}{8}\right)$ | $R=INT\left(\frac{N+5}{8}\right)$ | $R=INT\left(\frac{N+9}{16}\right)$ | $R=INT\left(\frac{N+9}{16}\right)$ |
| Do | Decreasing | $R=INT\left(\frac{N+3}{4}\right)$ | $R=INT\left(\frac{N+6}{8}\right)$ | $R=INT\left(\frac{N+5}{8}\right)$ | $R=INT\left(\frac{N+12}{16}\right)$ | $R=INT\left(\frac{N+10}{16}\right)$ |
| Low | Increasing | $R=INT\left(\frac{N+1}{4}\right)$ | $R=INT\left(\frac{N+1}{8}\right)$ | $R=INT\left(\frac{N+1}{8}\right)$ | $R=INT\left(\frac{N+1}{16}\right)$ | $R=INT\left(\frac{N+1}{16}\right)$ |
| Low | Decreasing | $R=INT\left(\frac{N+1}{4}\right)$ | $R=INT\left(\frac{N+2}{8}\right)$ | $R=INT\left(\frac{N+1}{8}\right)$ | $R=INT\left(\frac{N+4}{16}\right)$ | $R=INT\left(\frac{N+2}{16}\right)$ |

It will be seen from columns Nos. 2, 4 and 5 that a hysteresis effect is achieved by adding one or more binaries preceding the binary receiving the feedback. The arrangement depicted in column 2 is the arrangement of FIG. 8 and the hysteresis is one-eighth count. The one-eighth count difference is between frequency "increasing" and "decreasing" as can be seen from the term N+5/8 as compared to N+6/8 in the first and second rows of the table, or the term N+1/8 as compared to N+2/8 in the third and fourth rows. The arrangement of column No. 4 results in a hysteresis effect of three-sixteenths count and the arrangement of column No. 5 in one-sixteenth of a count. On the other hand, the arrangements illustrated in column Nos. 1 and 3 result in no such hysteresis effect (column 1 depicts the arrangement of FIG. 4). As the number of prior binaries (e.g., C, D, and so forth) are increased, the hysteresis effect approaches a limit of one-fourth tive half cycle. This arrangement eliminates the necessity of additional storage elements. The line sync circuit 61 serves to sync the reset signals with the negative half cycle of the power supply input.

Figure 9A:
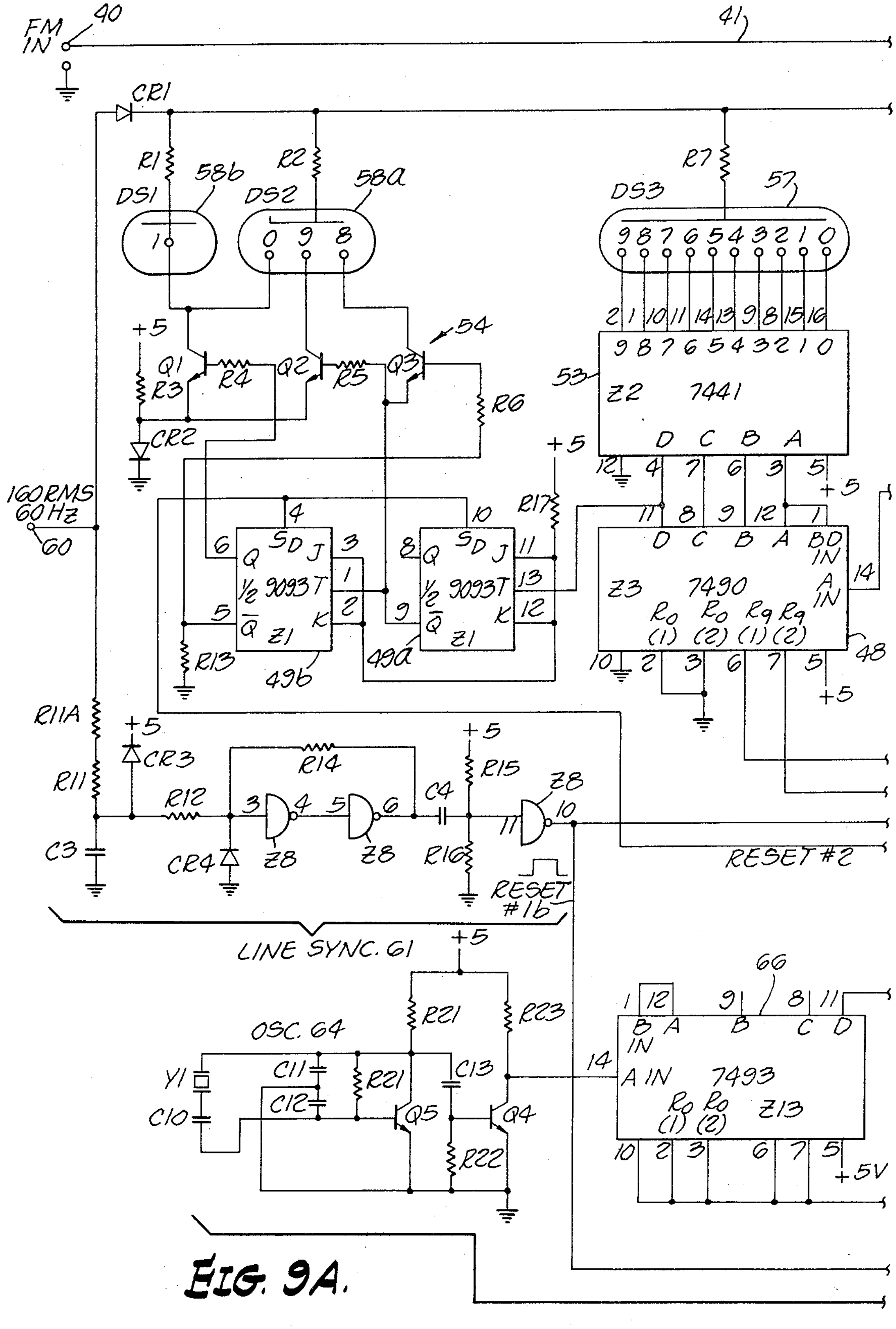
FIGS. 9*a* and 9*b* illustrate a detailed circuit diagram of a counter incorporating modifications according to the teachings of the present invention.
Figure 9B:
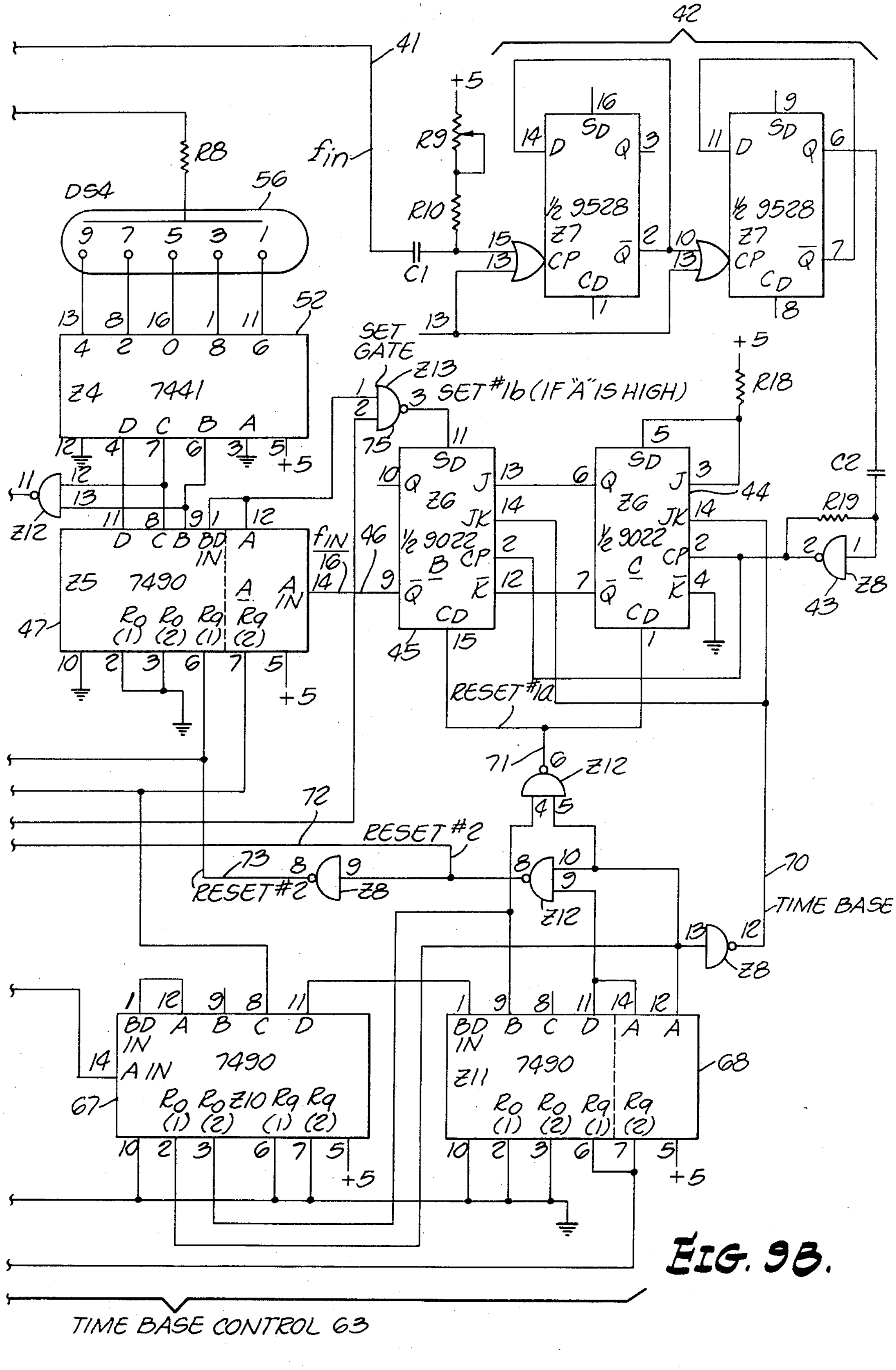

The time base and control circuit 63 includes a crystal oscillator 64 as illustrated in the lower left hand corner of FIG. 9*a*. The circuit 63 also includes decade counting units 66 through 68. The time base signal is applied on an output line 70, and enables the binary C to count. Although not required, the time base signal also enables B. Suitable reset signals are applied on output lines 71–73 of the circuit 63. The reset signals on these lines occur at slightly different times. The main criteria is to place binary B 45 in its correct initial state before the counter 47–49 is reset since resetting destroys the binary A ending state information in the first stage of the counting unit 47 ("1" bit). The reset sequence is as follows:

plying information to said fractional count modifier means.

2. A digital counter as in claim 1 wherein said fractional count modifier means and fractional count detector means include first and second binary circuits connected between said input circuit means and the input of the said digital counting means, and said feedback control means is coupled between the output of said second binary circuit and said first binary circuit to control the state of said first binary circuit as a function of the state of the second binary circuit.

3. A digital counter as in claim 1 wherein said fractional count modifier means and fractional count detector means include first and second binary circuits connected between said input circuit means and the input of the said digital counting means, and said feedback control means is coupled between the output of said second binary circuit and said first binary circuit to control the state of said first binary circuit as a function of the state of the second binary circuit at the end of the time base signal provided by said time base and control means.

4. A digital counter as in claim 2 including an additional binary circuit interposed between said input circuit means and said first binary circuit.

5. A digital counter as in claim 4 wherein said time base and control means resets said additional binary circuit upon reset of said second binary circuit and said digital counting means.

6. A digital counter as in claim 1 wherein said fractional count modifier means and said fractional count detector means comprise first and second binary circuits connected between said input circuit means and the input of said digital counting means, and said feedback control means comprises gate means coupled to receive signals from said second binary circuit and to apply control signals to said first binary circuit to (a) cause said first binary circuit to assume a first state if said binary circuit is in a second state at the end of the time base signal provided by said time base and control means, and (b) cause said first binary circuit to assume a second state if said second binary circuit is in a first state at the end of said time base signal.

7. A digital counter as in claim 1 wherein said fractional count modifier means and said fractional count detector means comprise first and second binary circuits coupled with said digital counting means, and said time base and control means provides first and second reset pulses with a first reset pulse being applied to reset said first binary circuit according to the state of said second binary circuit, and a second reset pulse being applied to reset said second binary circuit and said digital counting means.

8. A digital counter as in claim 6 wherein said time base and control means provides first and second reset pulses with the first reset pulse being applied to reset said first binary circuit according to the state of said second binary circuit, and a second reset pulse being applied to reset said second binary circuit and said digital counting means.

9. A digital counter as in claim 1 including first binary circuit means forming a predivider for providing a hysteresis effect, said fractional count modifier means and said fractional count detector means including second and third binary circuits connected between said first binary circuit means and the input of said digital counting means, said input circuit means being coupled to said first binary circuit means, and means coupled with said third binary circuit for sampling the state thereof at a predetermined portion of a time base signal provided by said time base and control means and for causing said second binary circuit to assume a state as a function of said state of said third binary circuit.

10. A digital counter as in claim 1 wherein said time base and control means includes a time base counter having binary means for forming said fractional count modifier means.

11. A digital counter characterized by stability in the visual readout thereof in the presence of slight frequency variations in input signals applied to said counter, comprising digital counting means for counting phase modified signals representative of input signals applied thereto over a time base period and providing a visual readout thereof, time base and control means for providing a time base signal independent of the input signals and controlling the application of said phase modified signals to said digital counting means, three binary circuit means preceding the input of said digital counting means for receiving input signals to be counted and for applying phase modified signals to said digital counting means, said first binary circuit means detecting the value of a fractional count occuring during a time base period, said second binary circuit means combining the fractional count of said first binary circuit means with the input signals, thereby modifying the phase of the input signals prior to the start of the time base period, and gate means responsive to the state of the third of said binary circuit means at a predetermined portion of said time base signal and connected to the second of said binary circuit means for allowing said second binary circuit means to assume a state which is a function of said state of said third binary circuit means.

12. A counter as in claim 11 wherein said time base and control means resets said first binary circuit means upon reset of said third binary circuit means and said digital counting means after said second binary circuit means has assumed said state.

13. A method of reducing jitter in the visual readout of a digital counter, said counter comprising digital counting means for counting input signals applied thereto and providing a visual readout thereof, time base control means for providing a time base signal, independent of the input signals, over which input signals to said counting means are to be counted, and binary circuit means for prescaling input signals to said counting means, said binary circuit means including at least first and second binary circuits, said second binary circuit detecting the value of a fractional count as the conclusion of the time base signal, and said first binary circuit modifying the phase of the input signals in response to the state of said second binary circuit, said first and second binary circuits controlled according to the steps of causing said first binary circuit to assume a first state if the second binary circuit is in a second state at the end of said time base signal, and causing said first binary circuit to assume a second state if the second binary circuit is in a first state at the end of said time base signal.

14. A method as in claim 13 including the step of additional predividing input signals to be counted before application thereof to said first binary circuit.

15. A method of reducing the jitter in the visual readout of a digital counter having digital counting means for counting input signals applied thereto and providing a visual readout thereof, time base means for providing a time base signal, independent of the input signals, over which input signals to said digital counter as are counted by said counting means, and binary circuit means for prescaling the input signals applied to said counting means, comprising the steps of sensing the state of said binary circuit means, said state of said binary circuit means being representative of the fractional count at the conclusion of the time base signal, and controlling the phase relationship between said time base signal and output signals from said binary circuit means to the input of said counting means as a predetermined function of the state of said binary circuit means during a portion of a preceding time base signal.

16. A digital counter characterized by reduced jitter in the output thereof comprising input circuit means for receiving input signals to be counted, and for producing first signals representative of the input signals, digital counting means for counting phase modified signals applied thereto over a given time base period and providing a readout thereof, time base and control means for providing a time base signal, independent of the input signals and for applying the phase modified signals to said digital counting means, said time base and control means including fractional count modifier means for modifying the phase of the first signals prior to the state of the time base signal, fractional count detector means coupled with said digital counting means for detecting the value of a fractional count occurring during the time base period of said time base and control means, said fractional count modifier means modifying the phase of the first signal in response to the value of the fractional count of said fractional count detector means, and feedback control means for accepting information from said fractional count detector means and applying information to said fractional count modifier means.

* * * * *